United States Patent
Markley

(10) Patent No.: US 7,628,719 B2
(45) Date of Patent: Dec. 8, 2009

(54) MECHANICAL STRAP TENSIONER FOR MULTI-STRAND TENSIONING

(75) Inventor: George L. Markley, Montour Falls, NY (US)

(73) Assignee: Borgwarner, Inc., Aubrun Hills, MI (US)

( * ) Notice: Subject to any disclaimer, the term of this patent is extended or adjusted under 35 U.S.C. 154(b) by 644 days.

(21) Appl. No.: 11/258,631

(22) Filed: Oct. 26, 2005

(65) Prior Publication Data

US 2007/0093328 A1    Apr. 26, 2007

(51) Int. Cl.
    *F16H 59/00* (2006.01)
(52) U.S. Cl. .................... 474/111; 474/140
(58) Field of Classification Search ............ 474/110, 474/111, 140; 267/71
    See application file for complete search history.

(56) References Cited

U.S. PATENT DOCUMENTS

| | | | |
|---|---|---|---|
| 4,395,251 A | 7/1983 | King et al. | 474/111 |
| 4,662,862 A | 5/1987 | Matson | 474/101 |
| 4,798,562 A | 1/1989 | Matson et al. | 474/101 |
| 5,266,066 A | 11/1993 | White | 474/111 |
| 5,797,818 A | 8/1998 | Young | 474/111 |
| 5,967,921 A | 10/1999 | Simpson et al. | 474/110 |
| 6,068,567 A | 5/2000 | Thompson | 474/111 |
| 6,322,469 B1 * | 11/2001 | Markley | 474/111 |
| 6,478,703 B2 | 11/2002 | Suzuki | 474/101 |
| 2003/0139239 A1 | 7/2003 | Fletcher et al. | |
| 2003/0166428 A1 * | 9/2003 | Beardmore | 474/110 |
| 2004/0152548 A1 | 8/2004 | Markley et al. | |

FOREIGN PATENT DOCUMENTS

JP    2002089636    3/2002

* cited by examiner

*Primary Examiner*—Bradley T King
*Assistant Examiner*—Nuri Boran Altun
(74) *Attorney, Agent, or Firm*—Brown & Michaels, PC

(57) ABSTRACT

A tensioner for a closed loop power transmission system for an internal combustion engine having a drive shaft terminating in a sprocket and at least one camshaft, each terminating in a sprocket, with a single continuous chain wrapping around all of the sprockets. The tensioner contains a pair of elongated tensioning arms, each one in slidable contact with one of the two strands of chain that traverses between the driving sprocket and the driven sprocket(s). Each tensioning arm contains a wear face that remains in constant slidable contact with the strand of chain to which it is adjacent. An adjusting arm connects one of the ends of the tensioning arms. The adjusting arm has a ratchet means that adjusts for the backlash in the system and takes up any slack in the chain.

11 Claims, 8 Drawing Sheets

PRIOR ART

MECHANICAL STRAP TENSIONER FOR MULTI-STRAND TENSIONING

FIELD OF THE INVENTION

The invention pertains to the field of chain tensioners. More particularly, the invention pertains to a tensioner for two strands of chain that contains a ratcheting device.

DESCRIPTION OF RELATED ART

A tensioning device, such as a hydraulic tensioner, is used as a control device for a power transmission chain, or similar power transmission device, as the chain travels between a plurality of sprockets that are connected to the operating shafts of an internal combustion engine. In this system, the chain transmits power from a driving shaft to a driven shaft, so that part of the chain is slack and part of the chain is tight. Generally, it is important to impart and maintain a certain degree of tension on the chain to prevent noise, slippage, or the unmeshing of teeth as in the case of a toothed chain. Prevention of such slippage is particularly important in the case of a chain driven camshaft in an internal combustion engine because the jumping of teeth will throw off the camshaft timing, possibly causing damage to the engine or rendering it inoperative.

However, in the harsh environment of the internal combustion engine, numerous factors cause fluctuations in the tension of any given portion of the chain. For instance, extreme temperature fluctuations and differences in the relative rates of thermal expansion coefficients among the various parts of the engine can cause the chain tension to vary between excessively high or very low levels. During prolonged use, wear to the components of the power transmission system can cause a steady decrease in chain tension. In addition, camshaft and crankshaft induced torsional vibrations cause considerable variations in chain tensions. For example, the reverse rotation of an engine, occurring during stopping of the engine or in failed attempts at starting the engine, can also cause significant fluctuations in chain tension. For these reasons, a mechanism is desired to remove excessive tensioning forces on the tight side of the chain while, at the same time, ensuring that adequate tension is applied to the slack side of the chain.

Hydraulic tensioners are a common method of maintaining proper chain tension. In general, these mechanisms employ a lever arm that pushes against the chain on the slack side of the power transmission system. The lever arm pushes toward the chain, tightening the chain when the chain is slack, and it must remain relatively immoveable when the chain tightens.

To achieve this, a hydraulic tensioner 1, as shown in prior art FIG. 1, typically contains a rod or cylinder as a piston 2, which is biased in the direction of the chain by a tensioner spring 3. The piston 2 is housed within a cylindrical housing 5, having an interior space which is open at the end facing the chain and closed at the other end. The interior space of the housing contains a pressure chamber 4 which is connected to a reservoir or exterior source of hydraulic fluid pressure via channels or ducts. The pressure chamber 4 is typically formed between the housing 5 and the piston 2, and it expands or contracts when the piston 2 moves within the housing 5.

Typically, valves are employed to regulate the flow of fluid into and out of the pressure chamber. For instance, an inlet check valve such as a ball-check valve opens to permit fluid to flow into the pressure chamber 4 when the pressure inside the chamber has decreased as a result of the outward movement of the piston 2. When the pressure in the pressure chamber is high, the inlet check valve closes, preventing fluid from exiting the pressure chamber. Closing the inlet check valve prevents the piston chamber from contracting, which in turn prevents the piston from retracting, thereby achieving a so-called "no-return" function.

Many tensioners also employ a pressure relief mechanism that allows fluid to exit the pressure chamber when the pressure in the chamber is high, thus allowing the piston to retract in a regulated manner in response to rapid increases in chain tension. In some tensioners, the pressure relief mechanism is a spring biased check valve. The check valve opens when the pressure exceeds a certain pressure point. Some tensioners may employ a valve which performs both the inlet check function as well as the pressure relief function.

Other mechanisms employ a restricted path through which fluid may exit the fluid chamber, such that the volume of flow exiting the fluid chamber is minimal unless the pressure in the fluid chamber is great. For instance, a restricted path may be provided through the clearance between the piston and bore, through a vent tube in the protruding end of the piston, or through a vent member between the fluid chamber and the fluid reservoir.

A hydraulic tensioner used with a tensioner arm or shoe is shown in Simpson et al., U.S. Pat. No. 5,967,921, incorporated herein by reference. Hydraulic chain tensioners typically have a plunger slidably fitted into a chamber and biased by a spring to provide tension to a specific strand of chain. A lever, arm or shoe is often used at the end of the plunger to assist in the tensioning of the chain. The hydraulic pressure from an external source, such as an oil pump or the like, flows into the chamber through passages formed in the housing. The plunger is urged outward against the arm by the combined forces of the hydraulic pressure and the spring tension.

When a force is applied to move the plunger in a reverse direction (retracting into the housing) away from the chain, typically a check valve will restrict the flow of fluid out of the chamber. In this way, the tensioner achieves the no-return function, i.e., movements of the plunger are easy in one direction (outward and away from the housing) but difficult in the reverse direction.

Blade tensioners are commonly used to control a chain or belt where load fluctuations are not so severe as to overly stress the spring or springs. A ratchet with a backlash mechanism may be added to tensioners to limit the effective backward or untensioned travel of the tensioning device.

Prior art FIG. 2 shows a conventional blade tensioner. The blade tensioner 10 includes a blade shoe 11 having a curved chain sliding face and numerous blade springs 21, preferably made of a seasoned metallic material to impart spring-like tension to the blade springs 21. The blade springs 21 are arranged in layers on the opposite side of the blade shoe 11 from the chain sliding face, and exert a biasing force on the blade shoe 11. The ends of each spring-shaped blade spring 21 are inserted in the indented portions 14 and 15, which are formed in the distal portion 12 and proximal portion 13 of the blade shoe 11, respectively.

A bracket 17 is provided for mounting the blade tensioner 10 in an engine. Holes 18 and 19 are formed in the bracket 17. Bolts or other secure mounting means are inserted into holes 18 and 19 for securing bracket 17 to the engine. A sliding face 16 is formed on the distal portion of the bracket 17 and slidably contacts the distal portion of the blade shoe 11. A pin 20 secured on the bracket 17 supports the proximal portion 13 of the blade shoe 11 so that it may pivot with the changes in the position of the chain.

FIG. 3 shows a chain tensioning device that has a pair of arms 202, 203 which are joined by a pivot 204. The arms 202, 203 are urged apart so that arm 203 applies tensioning force to a chain (not shown) by means of a spring 206 loaded cam block 205. To prevent collapse of arm 203 during load reversals of the chain, a catch disc 209 and rod 208 are arranged to prevent return movement of the spring loaded cam block 205.

FIG. 4 shows a tensioner that uses a ratchet device in a chain drive power transmission system. The power transmission system includes a drive shaft 302 having a sprocket 303 that uses a continuous loop chain 306 to drive the sprocket 305 of a driven shaft, such as a camshaft, 304. The ratchet tensioner 301 contains a tensioner housing 307 having a hole 312 for receiving a plunger 308 and a ratchet pawl 317 pivotally mounted about shaft 316 to the tensioner housing 307 and biased by a ratchet spring 318. The plunger 308 has teeth on one side of its outer perimeter to engage the ratchet pawl 317. The plunger 308 is biased outward from the hole 312 toward contact with tension lever 310 by the introduction of pressurized fluid into the hollow section 313 and by the force of the plunger spring 314. The tensioner lever 310 pivots on support shaft 309 and has a sliding face 311 that contacts and applies tension to the slack side of the timing chain 306. The rearward movement of the plunger 308 back into the hole 312 is limited by the one way engagement of the ratchet pawl 317 with the teeth on the plunger.

SUMMARY OF THE INVENTION

The present invention is a tensioner for a closed loop power transmission system of an internal combustion engine. The power transmission system includes a drive shaft terminating in a sprocket and at least one camshaft, each in turn terminating in a sprocket, with a single continuous chain wrapping around the sprockets. The tensioner contains a pair of elongated tensioning arms, each one in slidable contact with one of the two strands of chain that traverses between the driving sprocket and the driven sprocket(s). Each tensioning arm has a first end, a second end and a mid point and may be pivotally mounted to the engine housing at either the first end, the mid point or at some location therebetween. Each tensioning arm contains a wear face to maintain slidable contact with the strand of chain with which it is operably engaged.

The second end of each tensioning arm is pivotally connected to the other tensioning arm by an adjusting arm. The adjusting arm includes two pairs of rigid elongated straps that adjustably overlap with each other substantially in the middle of the length of the adjusting arm. The overlapping ends of the first pair of elongated straps terminate in hook shapes to provide a seat for a first end of a lengthening coil spring. The overlapping ends of the second pair of elongated straps also terminate in hook shapes that insert through slots formed in each of the first pair of elongated straps. The hook shaped ends of the second pair of straps provide a seat for a second end of the lengthening coil spring. Each strap of the first pair of elongated straps contains a rack of teeth that operatively meshes with a rack of teeth on each strap of the second pair of elongated straps. The lengthening coil spring urges the overlap of both pair of elongated straps so that the adjusting arm continues to shorten in response to increasing slack or wear conditions experienced by the chain. The meshing teeth provide a "no-return" feature by engaging the teeth in only one direction.

DETAILED DESCRIPTION OF THE INVENTION

Figure 1:
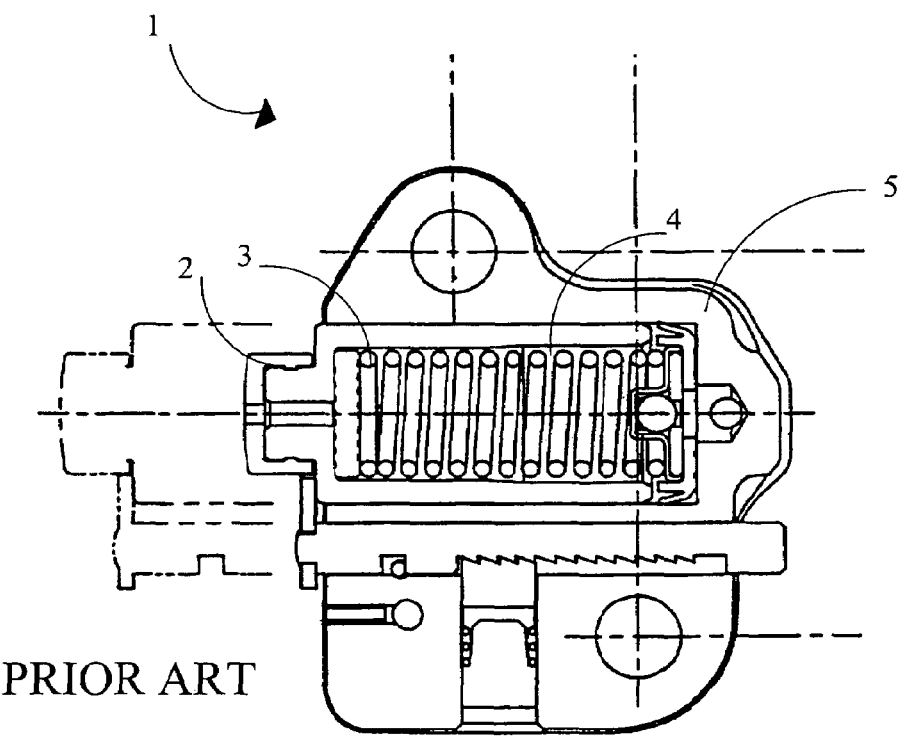
FIG. 1 shows a prior art blade type tensioner.
Figure 2:
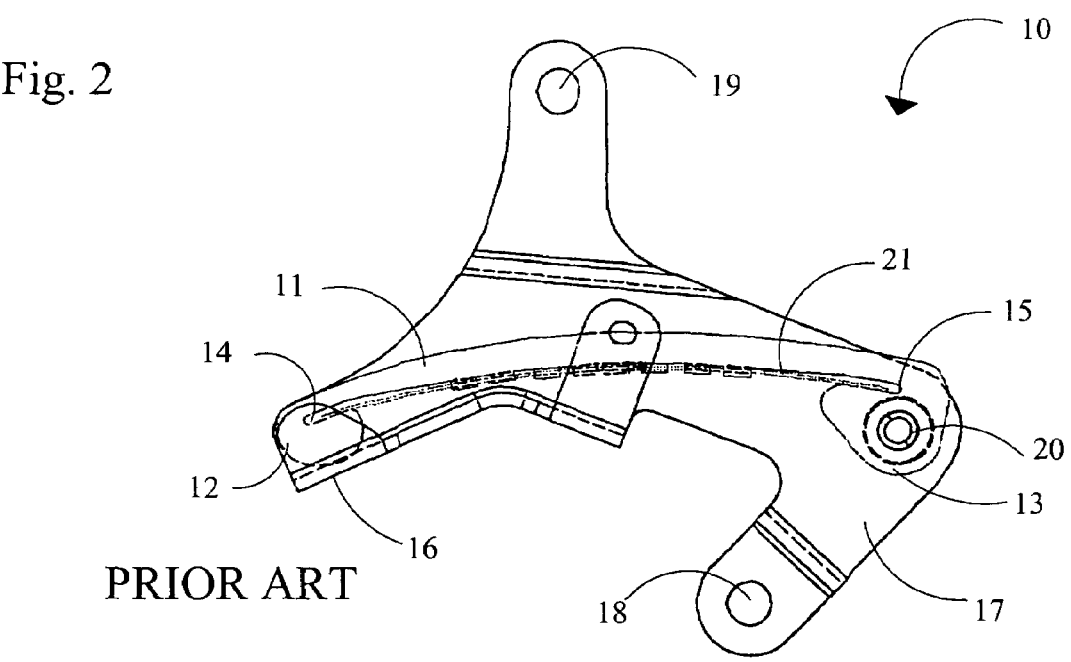
FIG. 2 shows a prior art hydraulic tensioner.
Figure 3:
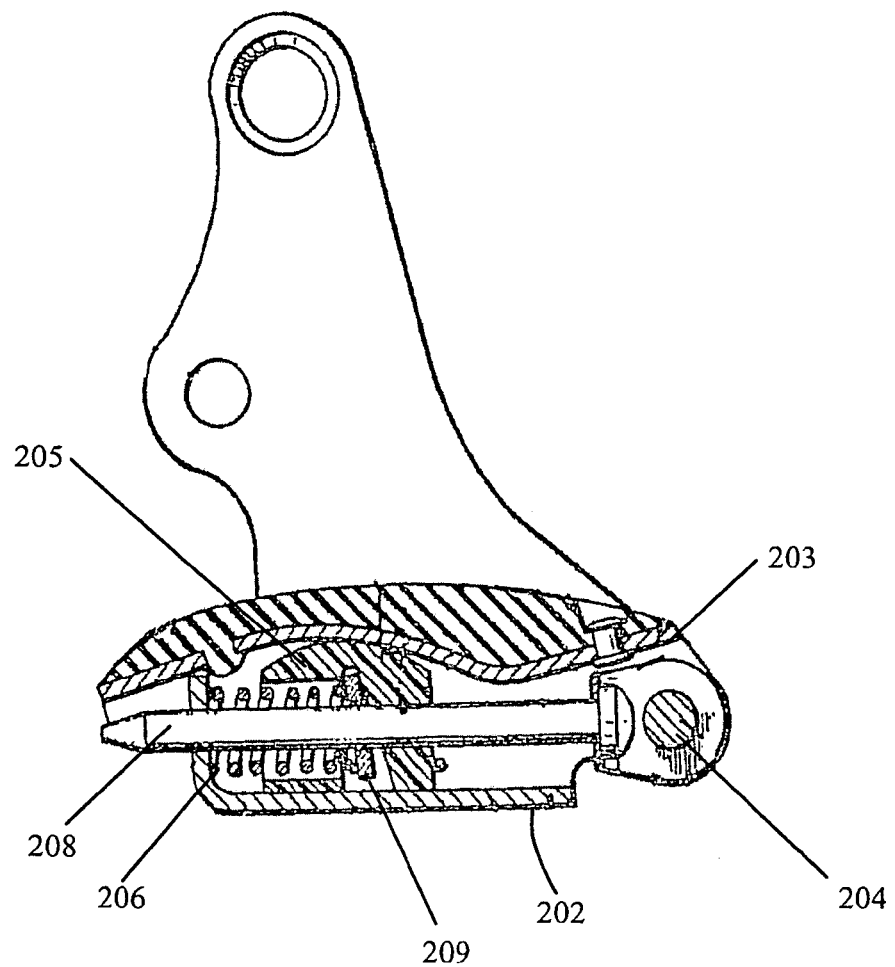
FIG. 3 shows an alternate prior art tensioner.
Figure 4:
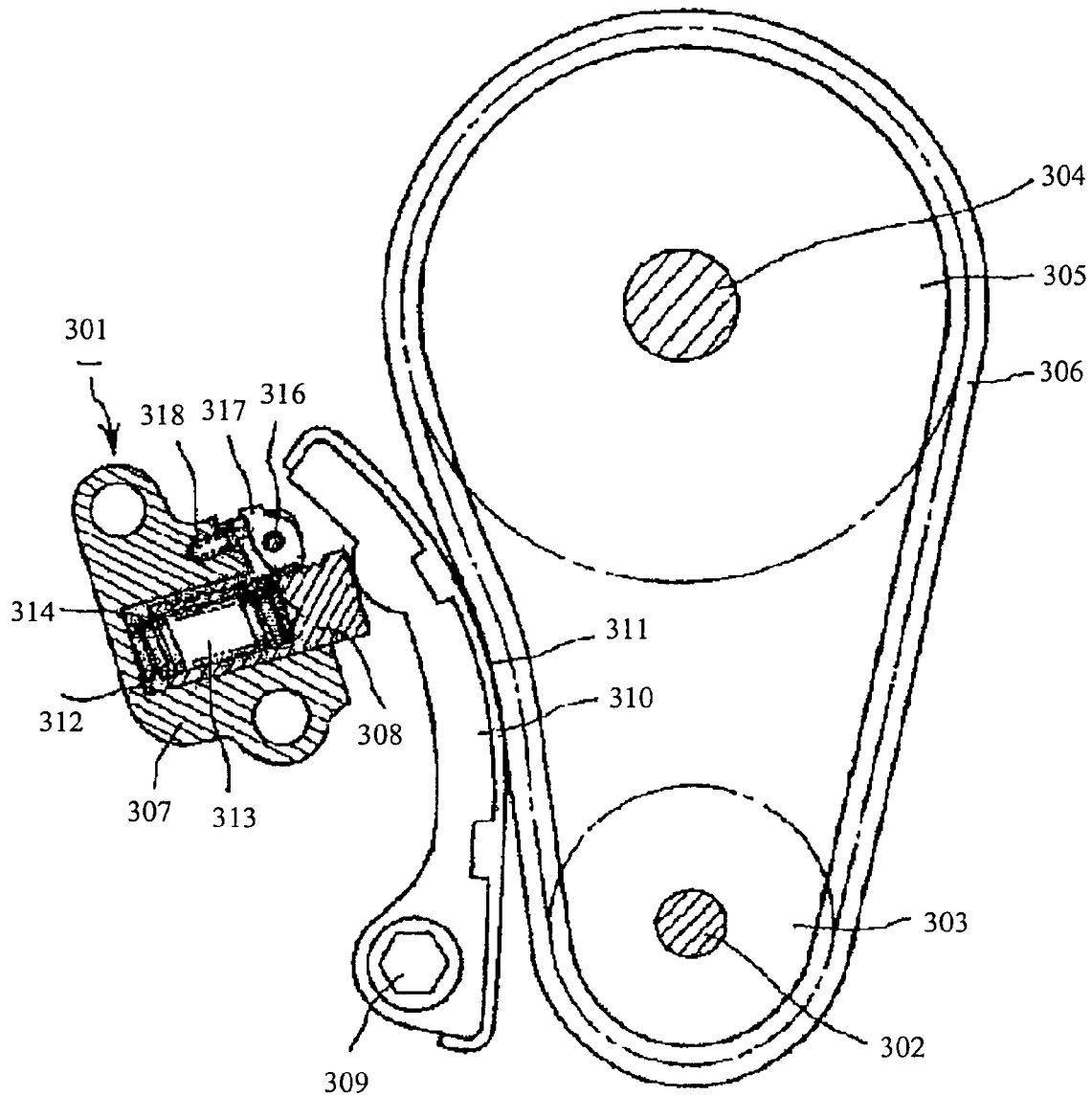
FIG. 4 shows a prior art ratcheting tensioner.
Figure 5:
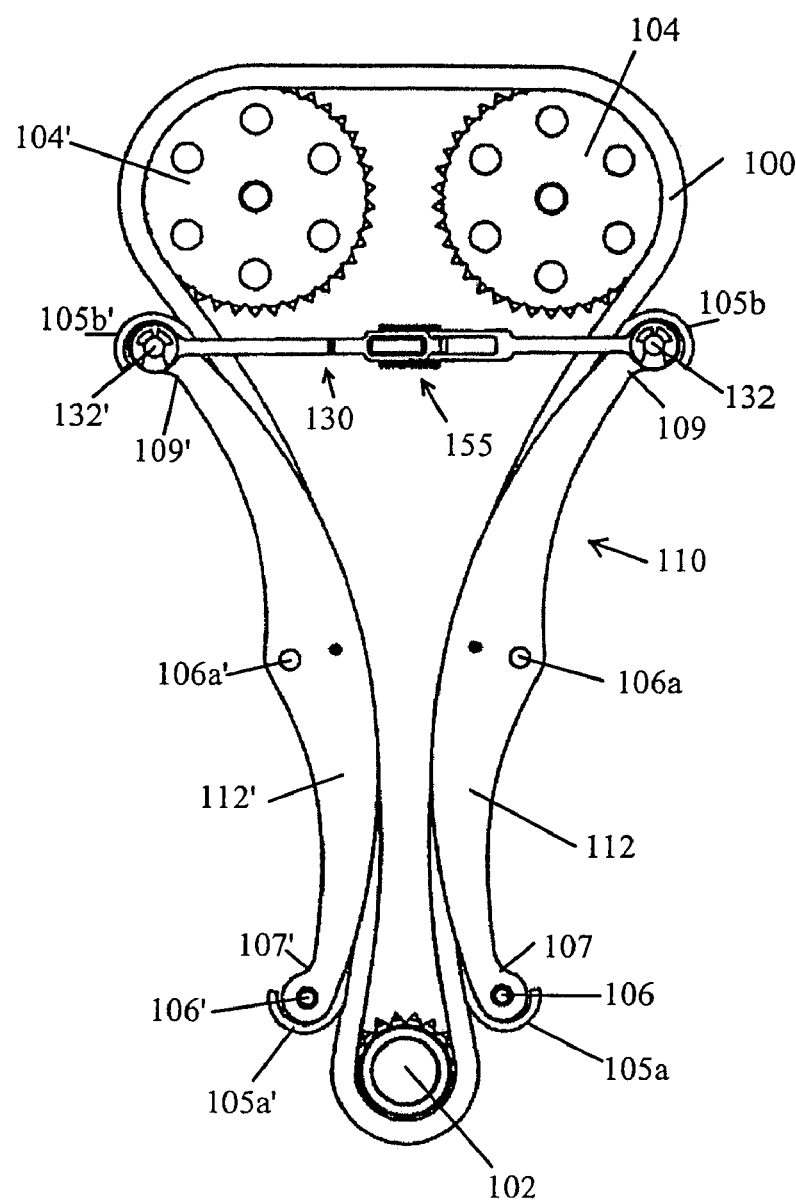
FIG. 5 shows a front elevational view of the tensioner of the present invention in operative engagement with a closed loop chain drive system.

Referring to FIG. 5, the tensioner 110 of the present invention is operatively engaged with a closed loop power transmission system of an internal combustion engine. The power transmission system contains a driving sprocket 102 and at least one driven sprocket 104, 104'. Power from the engine's drive shaft is transmitted from the driving sprocket 102 to the driven sprockets by means of a chain 100 or drive belt. Most commonly used with internal combustion engines are chain drives. Proper tension must be applied to the chain 100 at all times in order to prevent the jumping of the sprocket teeth by the chain during slackening of any portion of the chain during operation or as a result of increasing wear of the components over time.

The tensioner 110 includes a tensioning arm 112 that is operatively engaged with the outer surface of one of the strands of chain between the driving sprocket 102 and one of the driven sprockets 104. The second tensioning arm 112' of tensioner 110 is operatively engaged with the outer surface of the other strand of chain between the driving sprocket 102 and a second driven sprocket 104'. It should be understood that the tensioner 110 of the present invention is also capable of being used in a closed loop power transmission system that has only one driving and one driven sprocket.

Each tensioning arm, 112 and 112', may be pivotally secured to the face of the engine housing (not shown) by pivot mounting means 106 and 106' at respective first ends 107 and 107' of each tensioning arm 112 and 112', as shown in FIG. 5. The pivot mounting means 106 and 106' allow their respective tensioning arms 112 and 112' to pivot in response to changes in the tension of the chain 100. Alternative pivot mounting points may also be used, such as pivot mounting means 106a and 106a', which may be located substantially at a mid-point along the longitudinal length of each of the respective tensioning arms 112 and 112'. The mounting of tensioning arms 112 and 112' need not be symmetrical in that tensioning arm 112 may be pivot mounted to the engine housing at 106 while tensioning arm 112' may be pivot mounted at 106a'. Alternatively, tensioning arm 112' may be pivot mounted at 106' while tensioning arm 112 is pivot mounted at 106a. Also, tensioning arms 112 and 112' may concurrently be pivot mounted at 106a and 106a', respectively.

An alternative embodiment of tensioner 110 includes having one of the tensioning arms 112 or 112' securely mounted to the engine housing so that it cannot pivot in response to changing chain tension conditions. For example, tensioning arm 112 may be securely mounted to the engine housing at both locations 106 and 106a. The other tensioning arm 112' is allowed to pivot about a single pivot mount 106' in response to changing chain tension conditions.

Each tensioning arm 112 and 112' contains an elongated rectangular shaped chain wear face 105 and 105', respectively, that is semi-rigidly mounted along the length of each tensioning arm facing the strand of chain 100 with which it is operably engaged. Each chain wear face 105 and 105' terminates in hooked ends that wrap around the ends of the tensioning arm on which it is installed. Each chain wear face 105 or 105' is the contact surface with the strand of chain with which its corresponding tensioning arm is engaged.

Figure 9:
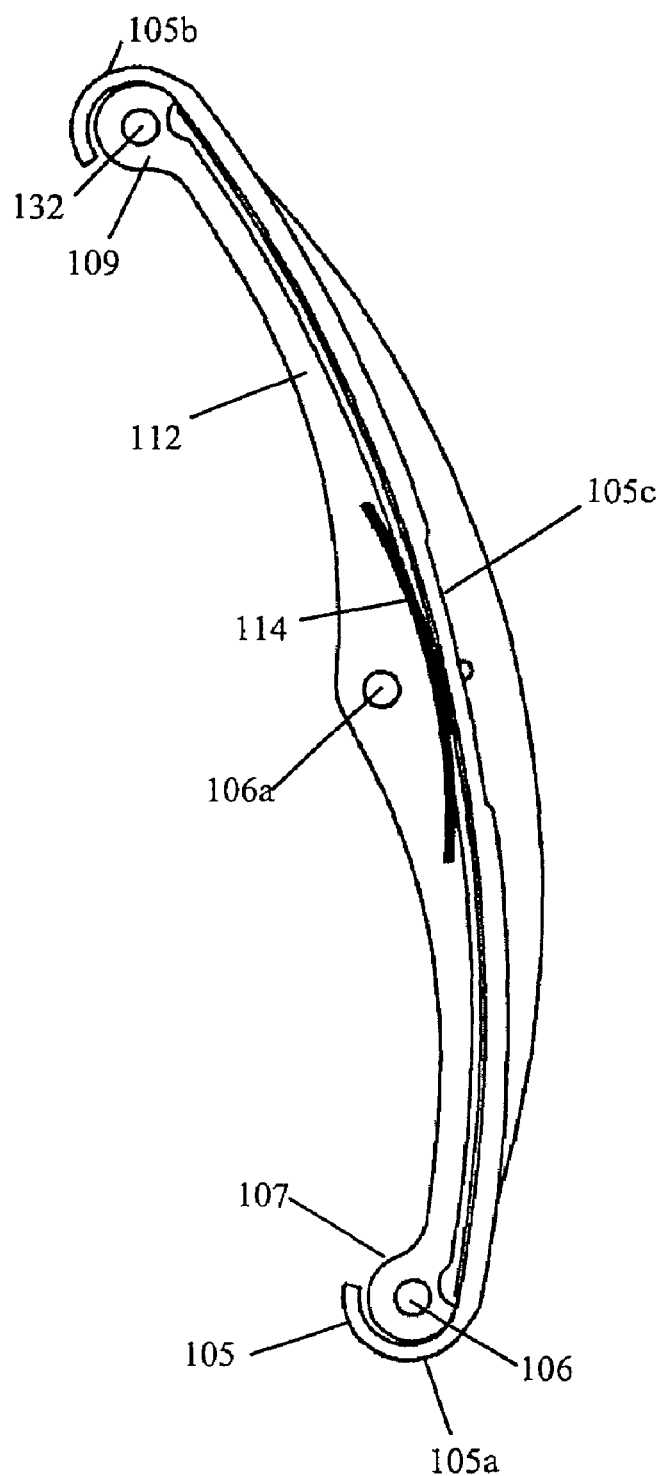
FIG. 9 is a cross sectional view of one of the tensioning arms containing a blade spring.

Each chain wear face 105 and 105' has a first end 105a and 105a', respectively, and a second end 105b and 105b', respectively. Each first end 105a and 105a' is joined to its corresponding second end 105b and 105b' by a middle portion that acts as the chain sliding face 105c and 105c'. This is best shown in FIG. 9. Each chain sliding face 105c and 105c' is in sliding contact with a different strand of chain 100. Each first end 105a and 105a' and each second end 105b and 105b' of its respective chain wear face 105 and 105' are curved underneath and around towards the center of the corresponding wear face. Each chain wear face 105 and 105' is longer than its corresponding tensioning arm 112 and 112' such that each curved first end 105a and 105a' receives the respective first end 107 and 107'of the corresponding tensioning arm 112 and 112'and each curved second end 105b and 105b' receives the respective second end 109 and 109' of the corresponding tensioning arm 112 and 112', thereby loosely securing each chain wear face 105 and 105' to its corresponding tensioning arm 112 and 112'. The chain wear faces 105 and 105' are preferably made of a material that is semi-flexible at engine operating temperatures, in order to allow them to bow out to conform to the changing tension conditions of the chain 100. Optionally, additional biasing means may be provided by one or more blade springs 114 located between the tensioning arm and the rear surface of each of the chain wear faces 105 and 105'. A gap clearance exists between each of the first ends 105a and 105a' of the chain wears faces 105 and 105' and the first ends 107 and 107' of tensioning arms 112 and 112'. As well, a gap clearance exists between the second ends 105b and 105b' of the chain wear faces 105 and 105' and the second ends 109 and 109' of tensioning arms 112 and 112'. As at least one blade spring 114 biases each of the chain guide elements 105 and 105' out and away from its respective tensioning arm, the. combined gap clearances between the ends of tensioning arms 112 and 112' and the ends of the chain wear faces 105 and 105' is gradually eliminated until the chain wear faces 105 and 105' can not bow out any further. At this point, the tensioning arms 112 and 112' alone cannot provide further chain tensioning.

The second ends 109 and 109' of each of their respective tensioning arms 112 and 112', are connected to each other by an adjusting arm 130. Referring.to FIG. 6, the second end 109 of tensioning arm 112 is secured to first ends 138 and 138', respectively, of a first pair of elongated straps 134 and 134' by pivot joint 132. The second end 109' of tensioning arm 112' is secured to first ends 140 and 140', respectively, of a second pair of elongated straps 136, 136', by pivot joint 132'. Elongated straps 134, 134', 136 and 136' may be made of any rigid material, such as, for example, steel, aluminum, alloys thereof, or non-deformable synthetic resinous composite materials.

Figure 6:
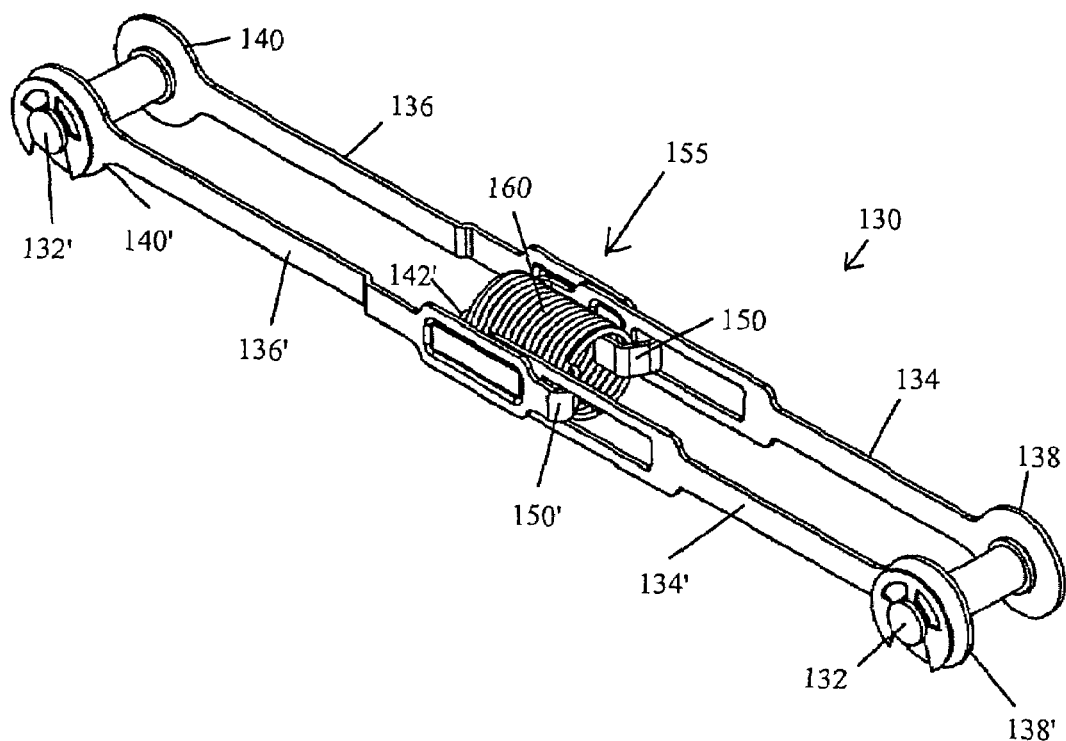
FIG. 6 shows an isometric view of the ratcheting device in the adjusting arm of the present invention.
Figure 7:
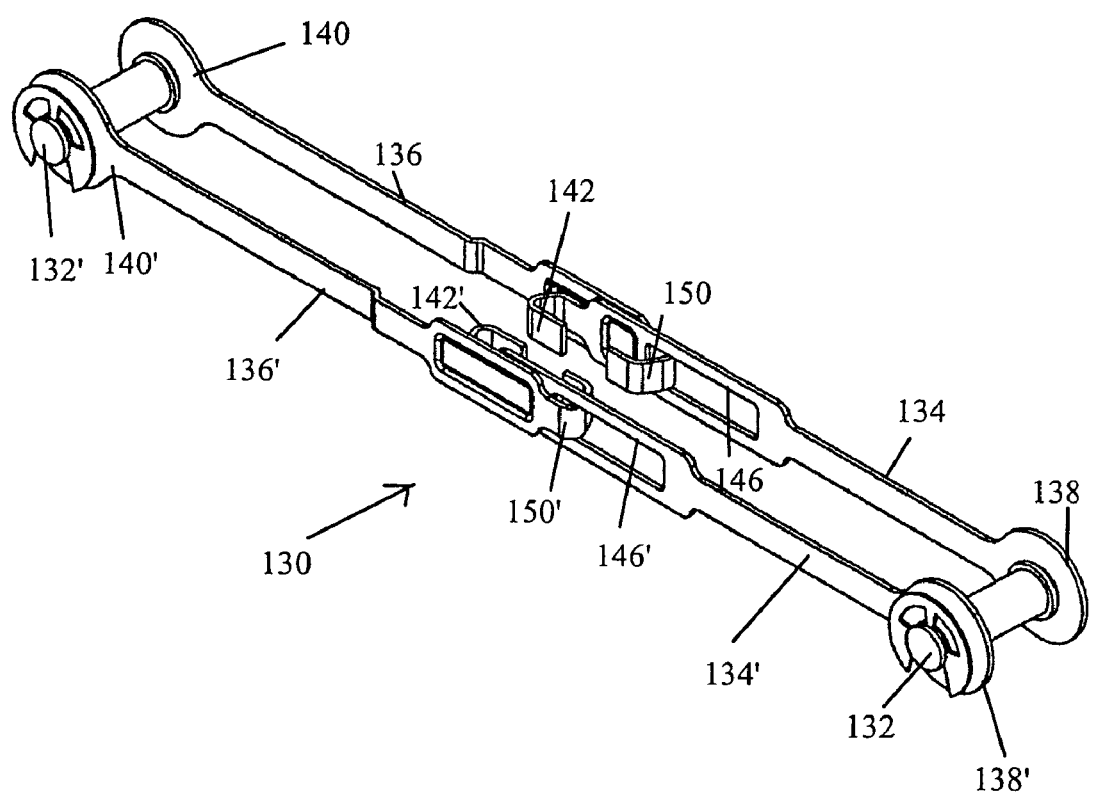
FIG. 7 shows the adjusting arm without the ratchet coil spring.

Referring to FIG. 7, the second ends 142 and 142', of their respective first pair of elongated straps 134 and 134' each terminate into a substantially 180° hook shape. The second ends 150 and 150' of their respective second pair of elongated straps 136 and. 136'also each terminate into a substantially 180° hook shape. Second end 150 is slidably engaged through a longitudinal slot 146 in elongated strap 134 and second end 150' is slidably engaged through a longitudinal slot 146' in elongated strap 134'. Second ends 142 and 142' create a seat to secure a first end of coil spring 160 (FIG. 6). A second end of coil spring 160 is secured by the seat created by second ends 150 and 150'. The resting state of coil spring 160 is longer than its length when installed in the adjusting arm 130 in order to provide a force to bias the respective second ends 142 and 142' away from second ends 150 and 150'. The elongating force of coil spring 160 urges the first pair of elongated straps 134 and 134' to overlap with the second pair of elongated straps 136 and 136', when required, in response to increasing slack or wear conditions exhibited by the chain 100.

Figure 8:
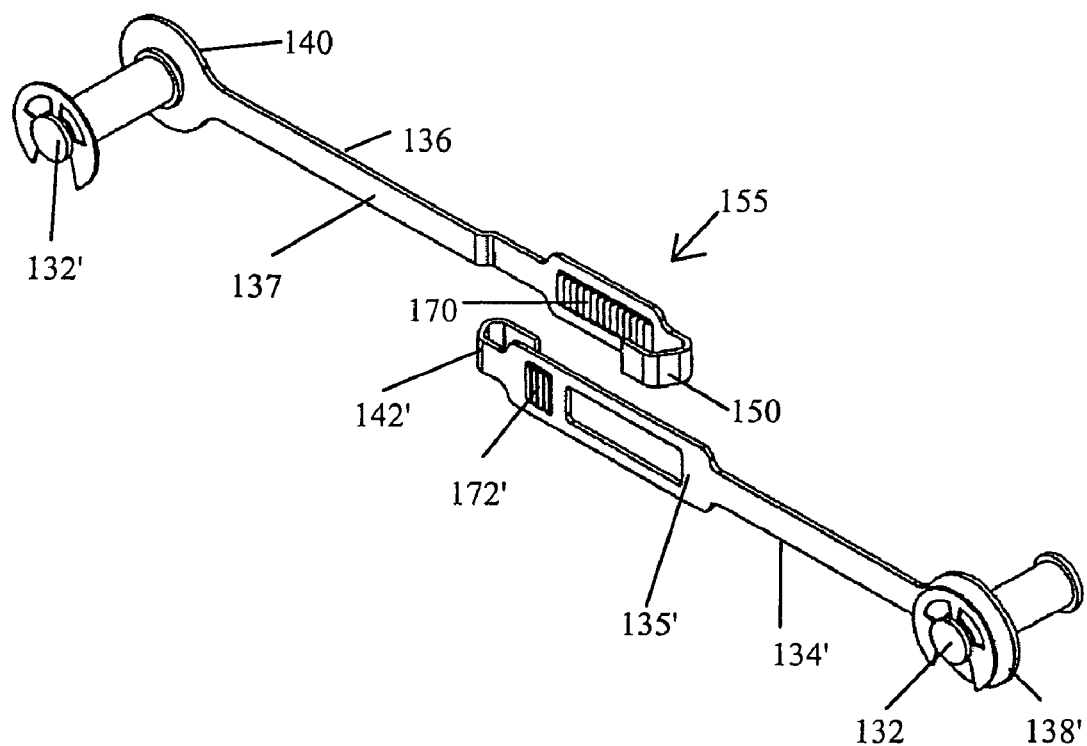
FIG. 8 shows two strap segments of the adjusting arm.

Referring to FIG. 8, various elements of the adjusting arm 130 are removed to better show certain features of ratcheting means 155. Located on the inner surface 137 and in proximity to the second end 150 of elongated strap 136 is an inner rack of teeth 170. Although not shown in this figure, the mirror image elongated strap 136' also contains the same elements as does elongated strap 136. Specifically, on the inner surface 137' and in proximity to the second end 150' of elongated strap 136' is a rack of teeth 170'. Located on the outer surface 135' and in proximity to the second end 142' of elongated strap 134' is an outer rack of teeth 172'. Also not shown in this figure, the mirror image elongated strap 134 contains similar elements as are present on elongated strap 134', that is, on the outer surface 135 and in proximity to the second end 142 of elongated strap 134 is an outer rack of teeth 172. When the adjusting arm 130 is fully assembled, the inner rack of teeth 170 of elongated strap 136 mesh with the outer rack of teeth 172 of elongated strap 134 and the inner rack of teeth 170' of elongated strap 136' mesh with the outer rack of teeth 172' of elongated strap 134'. The teeth are designed to index in only one direction in response to the force of the coil spring 160 urging the second ends 142 and 142' of the first pair of elongated straps 134 and 134' away from the second ends 150 and 150' of the second pair of elongated straps 13 and 136'. Consequently, the distance between the tensioning arms 112 and 112' will decrease in response to an increase in slack or excessive wear conditions exhibited by chain 100. As the distance between the tensioning arms 112 and 112' decreases, a relatively constant tensioning force on chain 100 is maintained.

In order to insure that the inner racks of teeth 170 and 170' remain securely engaged with their corresponding outer racks of teeth 172 and 172', the coil spring seating surfaces of the second ends 150 and 150' are angled toward the central axis of the adjusting arm 130. Concurrently, the coil spring seating surfaces of the second ends 142 and 142' are angled outward away from the central axis of the adjusting arm. When the compressed coil spring 160 is seated between second ends 142 and 142' and second ends 150 and 150', its natural tendency to return to its elongated resting state generates a force on both the angled portions of second ends 142 and 142' and the angled portions of second ends 150 and 150' to insure that the corresponding enmeshed racks of teeth do not jump out of engagement with each other until desired in response to changing chain tension conditions.

The tensioning arms 112 and 112' may only employ wear faces 105 or 105' to provide tensioning in the direction of a slack or worn chain. In conjunction with the ratcheting means 155, the minimal force applied by the wear faces alone may be sufficient enough to tension certain chain drive transmission systems. This embodiment may provide the desired tension for certain power transmission systems. However, other drive transmission systems may have different tension requirements. FIG. 9 shows a cross section of tensioning arm 112 in which an alternate embodiment is shown. A blade spring 114 is added within a recess in the body of the tensioning arm 112 to provide additional force for urging the wear face 105 into forcible sliding contact with the chain 100. Similar embodiments would include more than one blade spring, either stacked on top of one another in a single recess or placed in separate recesses along the length of the tensioning arm 112. It should be understood that tensioning arm 112' may also incorporate at least one blade spring, if desired. The design parameters of each specific chain drive system may necessitate a tensioner 110 in which both tensioning arms 112 and 112' contain blade springs, or one in which only one of the tensioning arms would contain blade springs. Also, neither one of the tensioning arms 112 or 112' might contain a blade spring.

Backlash is the backward or untensioned travel of a tensioning device. The combination of the amount of force provided by the wear faces 105 and 105' and the indexing movement of the ratcheting means 155 of the invention controls the amount of backlash that occurs in the operation of a closed loop chain driven power transmission system. The gap created between the body of the tensioning arms 112 and 112' and the under side of their respective wear faces 105 and 105' is limited by the amount of gap clearance, previously discussed, between the ends of the wear faces 105 and 105' and the corresponding ends of the tensioning arms 112 and 112'. The total amount of the combined gap from both tensioning arms defines the backlash in the power transmission system. Backlash determines the timing variation in the driven sprocket(s) and must be kept to a minimum. When slack in the chain cannot be absorbed because the maximum gap between the wear faces 105 and 105' and their corresponding tensioning arms 112 and 112' has been reached, the coil spring 160 of the ratchet means 155 provides the required force to index the meshed racks of teeth by at least one tooth and in only one direction. The indexing of the teeth increases the overlap between the pairs of elongated straps of the adjusting arm 130, and biases the second ends 109 and 109' of the corresponding tensioning arms 112 and 112' toward each other. The reduced distance between the second ends of the tensioning arms 112 and 112' reestablishes forceful contact of the wear faces 105 and 105' with their respective strands of chain 100. The unidirectional movement of the teeth prevents the adjusting arm 130 from returning to its previous elongated state which would result in an inability to tension the chain due to the loss of or a reduction in forceful contact between the wear faces 105 and 105' and their corresponding strands of chain.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for imparting tension to a chain of a closed loop power transmission system of an internal combustion engine comprising:
    a) a first elongated tensioning arm having a first end and a second end, the first elongated tensioning arm positioned in operative engagement with a first strand of the chain, the first elongated tensioning arm pivotally secured to a first mounting means on the engine;
    b) a second elongated tensioning arm having a first end and a second end, the second elongated tensioning arm positioned in operative engagement with a second strand of the chain, the second elongated tensioning arm pivotally secured to a second mounting means on the engine; and
    c) an adjusting arm having a first end and a second end and a ratcheting means located substantially equidistant between the first end and the second end;
    wherein the first end of the adjusting arm is pivotally attached to the second end of the first elongated tensioning arm and the second end of the adjusting arm is pivotally attached to the second end of the second elongated tensioning arm; the adjusting arm having two pairs of elongated straps, each elongated strap having a first end and a second end, wherein the first ends of the first pair of straps form the first end of the adjusting arm, the first ends of the second pair of straps form the second end of the adjusting arm, the second ends of the first pair of straps form a seat to retain a first end of a coil spring and the second ends of the second pair of straps form a seat to retain a second end of the coil spring and a first rack of teeth on an inner surface of each of the first pair of straps proximal to the second ends of each of the first pair of straps and a second rack of teeth on an outer surface of each of the second pair of straps proximal to the second ends of each of the second pair of straps whereby the adjusting arm responds to an increase in slack or excessive wear conditions of the chain; and
    further wherein each first rack of teeth meshes with the second rack of teeth to create a unidirectional no-return ratcheting means.

2. The tensioner of claim 1 further comprising an elongated first wear face having a first end, a second end and a chain sliding face wherein the first end of the elongated wear face wraps around the first end of the first tensioning arm and the second end of the wear face wraps around the second end of the first tensioning arm so that the chain sliding face slidably contacts the chain.

3. The tensioner of claim 2 further comprising at least one blade spring disposed between the first tensioning arm and the first wear face to bias the first wear face toward the chain in response to slack conditions of the chain.

4. The tensioner of claim 1 further comprising an elongated second wear face having a first end, a second end and a chain sliding face wherein the first end of the wear face wraps around the first end of the second tensioning arm and the second end of the wear face wraps around the second end of the second tensioning arm so that the chain sliding face slidably contacts the chain.

5. The tensioner of claim 4 further comprising at least one blade spring disposed between the second tensioning arm and the second wear face to bias the second wear face toward the chain in response to slack conditions of the chain.

6. The tensioner of claim 1 wherein the first end of the first tensioning arm is pivotally mounted to the first mounting means on the engine.

7. The tensioner of claim 1 wherein the first end of the second tensioning arm is pivotally mounted to the second mounting means on the engine.

8. The tensioner of claim 1 wherein the first tensioning arm is pivotally mounted to the first mounting means on the engine at substantially a mid point along the length of the first tensioning arm.

9. The tensioner of claim 1 wherein the second tensioning arm is pivotally mounted to the second mounting means on the engine at substantially a mid point along the length of the second tensioning arm 10. The tensioner of claim 1 further comprising a second mounting means to non-pivotally secure the first tensioning arm to the engine.

11. The tensioner of claim 1 further comprising a second mounting means to non-pivotally secure the second tensioning arm to the engine.

* * * * *

UNITED STATES PATENT AND TRADEMARK OFFICE
CERTIFICATE OF CORRECTION

PATENT NO. : 7,628,719 B2 Page 1 of 1
APPLICATION NO. : 11/258631
DATED : December 8, 2009
INVENTOR(S) : George L. Markley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this

Second Day of November, 2010

David J. Kappos
*Director of the United States Patent and Trademark Office*